Jan. 29, 1963  R. F. LO PRESTI  3,075,633
AUTOMATIC BELT TRAINING ROLLER ASSEMBLY FOR A BELT CONVEYOR
Filed April 17, 1959  3 Sheets-Sheet 1
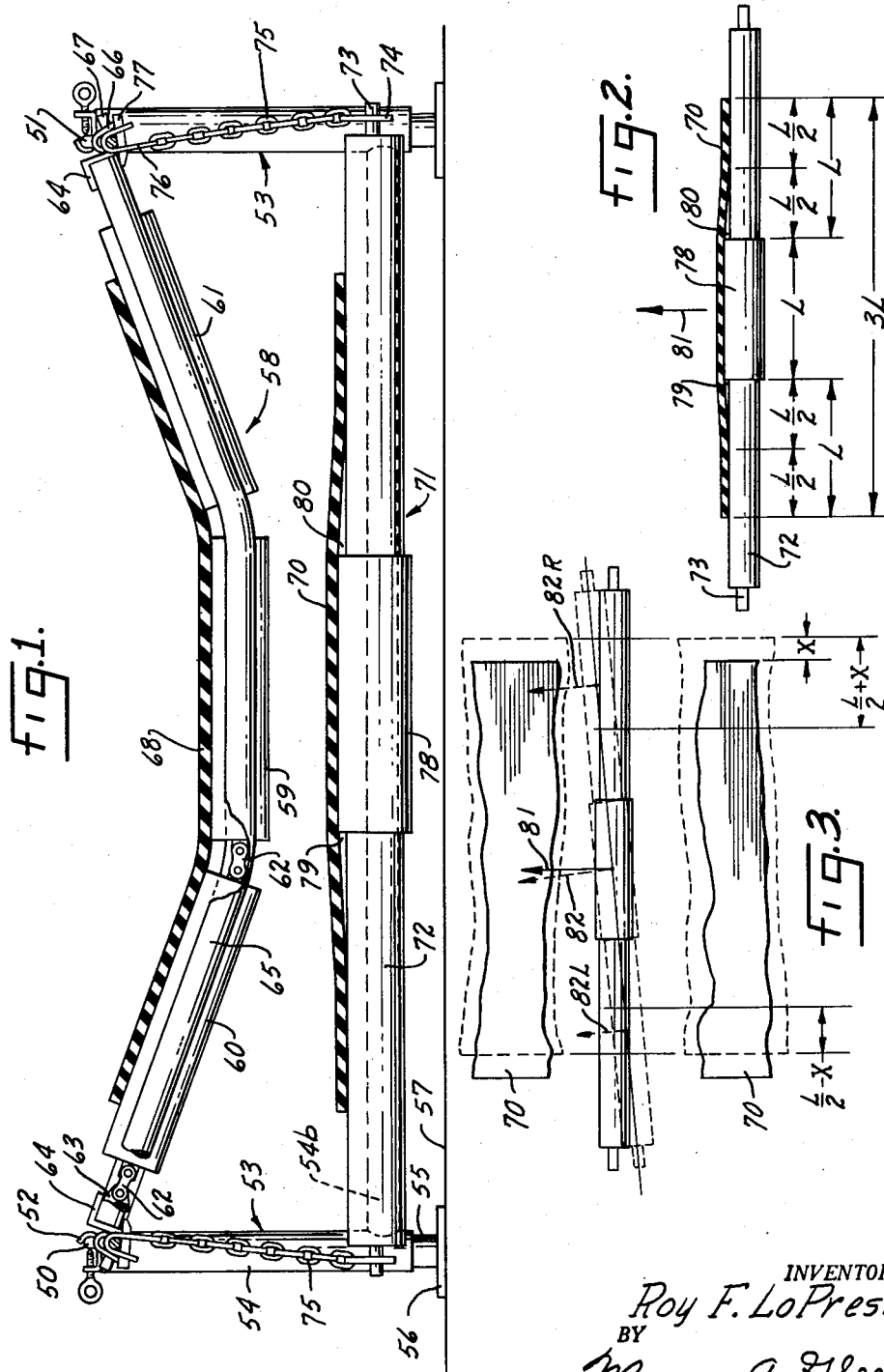
INVENTOR.
Roy F. LoPresti,
BY
Murray A. Gleeson
ATTORNEY.

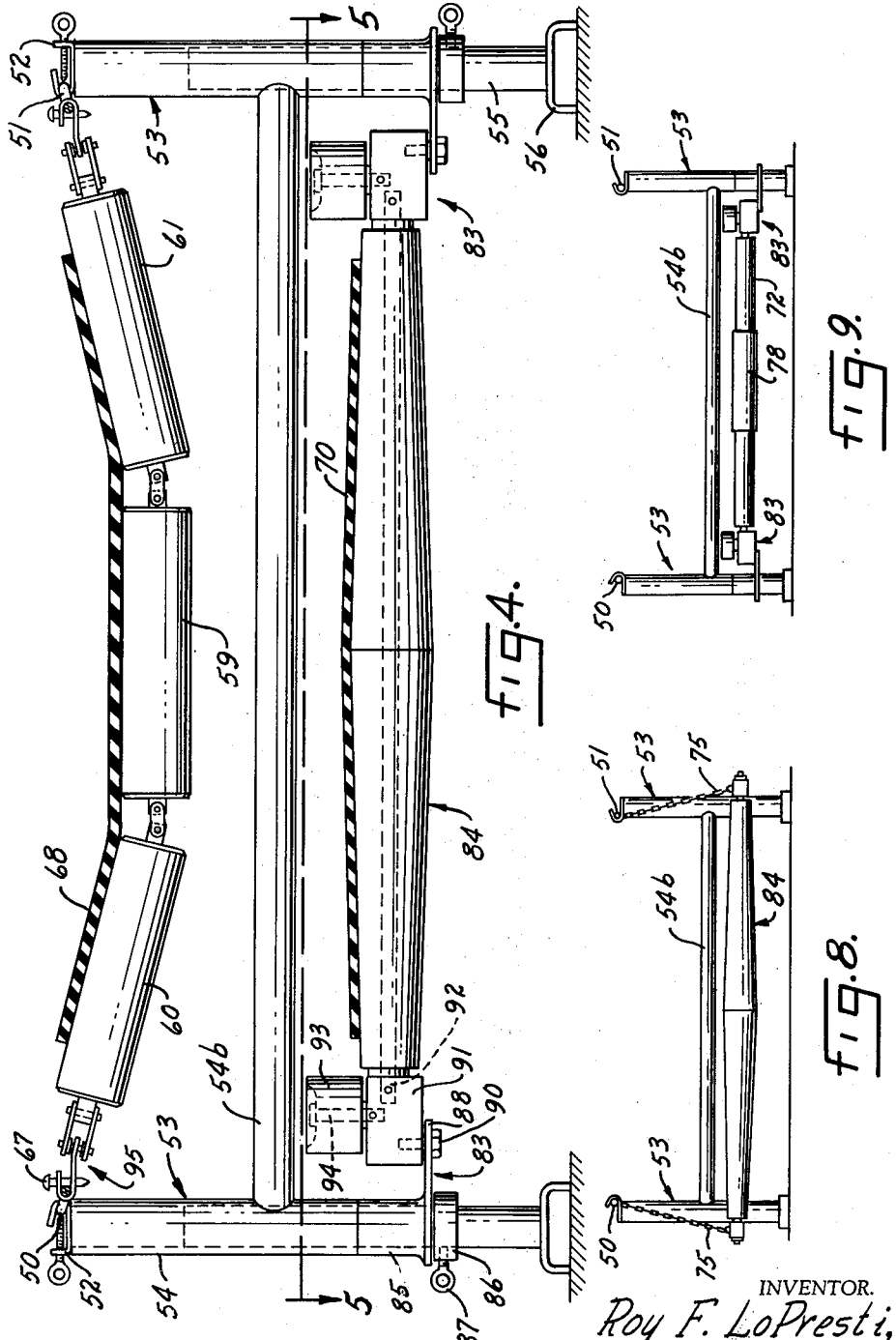

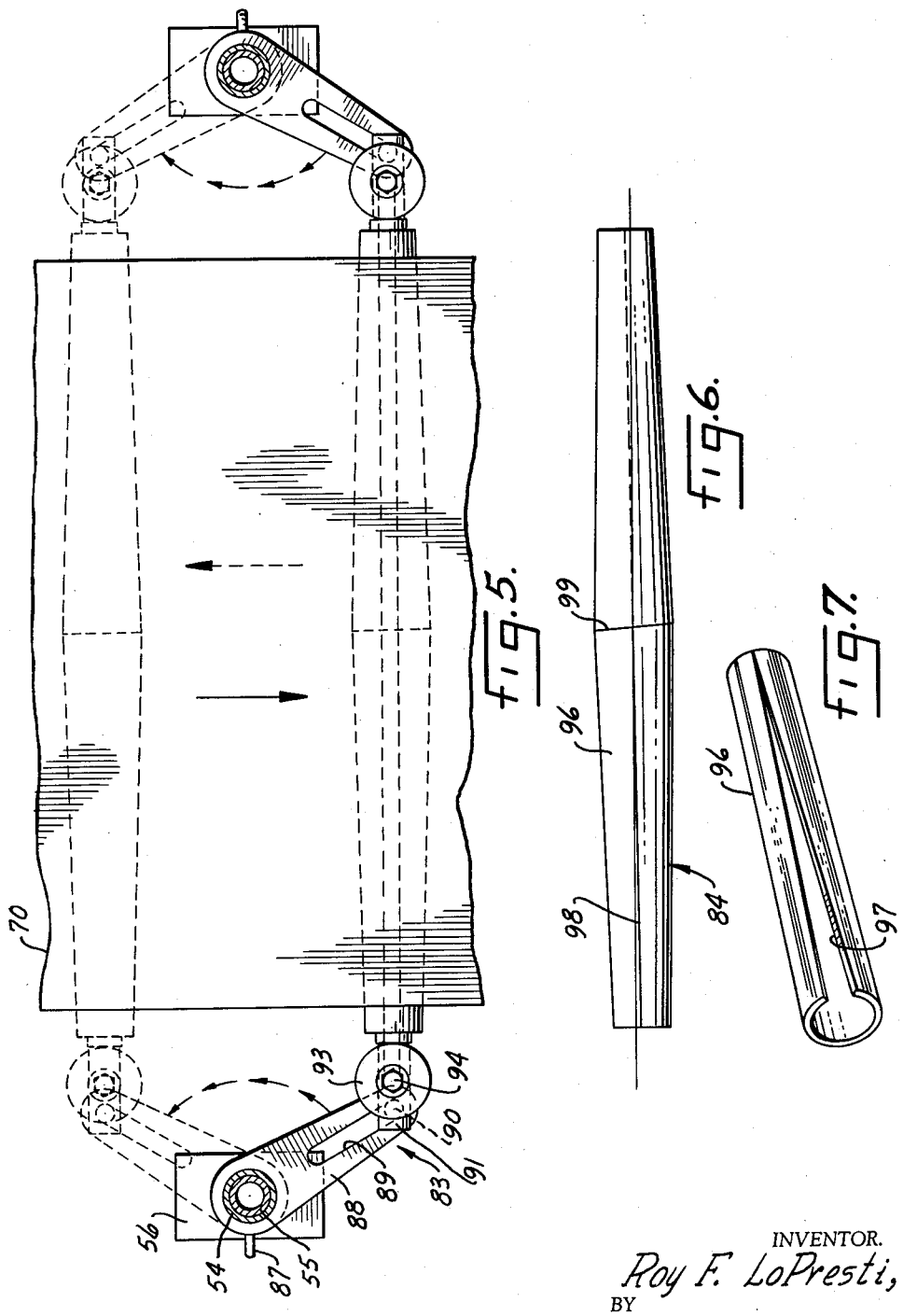

United States Patent Office 3,075,633
Patented Jan. 29, 1963

3,075,633
AUTOMATIC BELT TRAINING ROLLER ASSEMBLY FOR A BELT CONVEYOR
Roy F. Lo Presti, Chicago, Ill., assignor to Goodman Manufacturing Company, Chicago, Ill., a corporation of Illinois
Filed Apr. 17, 1959, Ser. No. 807,227
10 Claims. (Cl. 198—202)

This invention relates generally to belt conveyors and particularly to training roller assembles for use in such conveyors.

The conveyors generally comprise a pair of flexible strands or wire ropes trained along a conveying course and a plurality of troughing idler assembles suspended from and extending between the ropes. The idler assemblies generally include a series of interconnected rollers which may be free to flex in a vertical plane with respect to one another or a partially or completely restrained from flexing by a rigid or semirigid cradle assembly. The idler assemblies form a bed for the conveying or carrying reach of a flexible conveyor belt.

The wire ropes in turn are suspended from intermediate support structures. In the case of floor-supported conveyor systems, a plurality of support stands are spaced at predetermined intervals along the conveying course and the ropes are carried by the stands. In other installations the strands or rope sideframes may be suspended from an elevated support, such as the roof of a mine, by hangers. In any event the intermediate supporting structures are spaced close enough together to prevent undue sag of the loaded conveyor between adjacent supports.

Belt training is a problem in all belt conveyors. Usually the belt will run centered or trained in a flexible strand belt conveyor when certain operating conditions are present. These conditions include maintenance of adjacent roller assemblies in the same plane so that each makes substantially equal contact with the belt, a substantially uniformly distributed load, and substantially perpendicular placement of the roller assemblies with respect to the direction of belt travel. In actual practice these conditions are occasionally difficult to obtain without corrective equipment. If a return roller assembly is tilted with respect to the direction of belt travel for example, the belt will tend to detrain sideways toward one edge. This causes excessive wear on the belt edge, and may even set up disruptive strains in the system.

Various devices have been proposed to remedy belt detraining. Most of them require additional parts which increases the cost and complexity of the conveyor installation. Maintenance problems are also increased which is a serious handicap in coal mining, for example, where headroom is often quite restricted and maintenance working conditions are awkward and difficult.

Accordingly, a primary object of this invention is to provide a belt conveyor system which utilizes the inherent forces resulting from the coaction of the belt and the roller assemblies to maintain the belt centered.

Yet a further object is to provide an automatic belt training roller assembly having a roller of differential diameter which produces, in co-operation with a relatively freely suspended roller assembly connecting structure, a belt training effect.

Another object is to provide a roller assembly having a roller with a center portion of substantially larger diameter than side portions to thereby set up differential drag forces on the belt which cant the roller and train the belt.

Another object is to provide a roller assembly connecting structure which permits the end of the assembly to shift forward and backward so that the automatic training effect between the belt and assembly tends to shift the belt to a centered position.

Other objects and advantages of the invention will become apparent from the following description taken in connection with the accompanying drawings wherein by way of illustration and example certain embodiments of the invention are set forth.

The invention is illustrated more or less diagrammatically in the accompanying drawings wherein:

FIGURE 1 is a section through a flexible strand conveyor illustrating a preferred embodiment of the invention;

FIGURE 2 is a schematic illustration of the relationship of forces between the belt and a return roller in an equilibrium condition;

FIGURE 3 is a partly schematic plan view of a return roller and belt illustrating the position of the roller in an equilibrium condition and when undergoing a detraining adjustment;

FIGURE 4 is a section through a flexible strand conveyor illustrating another embodiment of the invention;

FIGURE 5 is a view taken substantially along the line 5—5 of FIGURE 4;

FIGURE 6 is a plan view of a double tapered roller utilizable in the assembly of FIGURES 4 and 5;

FIGURE 7 is a perspective view illustrating one method of forming the roller of FIGURE 6;

FIGURE 8 is a diagrammatic sketch illustrating the double tapered roller of FIGURE 4 with the supporting structure of FIGURE 1; and FIGURE 9 is a diagrammatic sketch illustrating the fat center roller of FIGURE 1 with the supporting structure of FIGURE 4.

A sectional view through a flexible strand conveyor of the type illustrated in the Craggs et al. Patent No. 2,875,886 is illustrated in FIGURE 1. The conveyor includes a pair of flexible strands 50 and 51 resting in strand seats 52 secured to the top of supporting stands indicated generally at 53. The stands consist of telescoping tubular members 54 and 55 secured to a base or foot 56 resting on the ground 57. Cross strut 54b maintains the stands a fixed distance apart.

A plurality of troughing roller assemblies are spaced at convenient distances along the strands. In this instance the roller assemblies, indicated generally at 58, are shown suspended from the strands but they may be suspended from the roof. The carrying roller assemblies include essentially a center primary load carrying roller 59 flanked by a pair of end or wing rollers 60 and 61. The rollers are flexibly connected by links 62 which provide flexing motion in a vertical plane perpendicular to the belt and substantially transverse to its direction of travel. The outside links are connected, in this instance, to an inwardly projecting ear 63 secured to end plate 64. One or a pair of side frame members 65 having a susbtantially horizontal mid-portion and upturned ends are welded to the end plates. The end plates and frame members form in effect a cradle which straddles the roller assembly and maintains the ends of the rollers a substantially fixed distance apart. The cradle and rollers are suspended from the flexible strands by inverted U-shaped connectors 66 welded or otherwise suitably secured to the end plates, and wedges 67. The conveying reach of a load carrying belt is indicated at 68.

The return reach 70 of the conveyor belt is supported at spaced intervals by return roller assemblies indicated generally at 71. These assemblies may be equi-distantly or irregularly spaced along the conveyor course, depending upon available clearance and operating conditions. Usually they are positioned less frequently than the carrying roller assembly since their primary function is to keep the belt from dragging along the ground and they carry no weight other than the belt itself.

In this instance the return assembly includes a single roller 72 rotatable on a dead shaft 73 which may be continuous or discontinuous throughout the length of the roller. The shaft is secured in a suitable bracket 74 and the entire assembly suspended from the flexible strands by elongated connectors 75 which permit the ends of the roller to move backward and forward with respect to the direction of belt travel independently of one another. In this instance the connectors are lengths of chain connected at the bottom to the brackets 74 and at the top to inverted U-shaped saddle members 76. Wedges 77 passing through the two legs of the saddle member force the strand into tight seating engagement.

Return roller 72 includes a center portion of an increased diameter 78 which breaks the contact between the belt and roller adjacent its ends as at 79 and 80.

In FIGURE 2 the contact between the belt and return roller 72 have been diagrammatically illustrated. The width of the belt is indicated generally at 3L and the length of the increased diameter center portion as L. For purposes of illustration it will be assumed that the belt contacts the center portion along its entire length. There is no contact between the belt and roller immediately adjacent the end of the thickened or fat center for a distance of $L/2$ due mainly to the inherent stiffness in the belt. The edges of the belt then make contact with the reduced diameter portions of the roller for a distance of $L/2$. These values are relative, although fairly accurate for a 36 inch wide by ¾ inch thick belt.

The positively driven belt causes the roller to rotate at a speed somewhere between the peripheral speed of the fat center and reduced diameter portions of the roller. (In a conventional uniform diameter roller the peripheral speed of the roller will be equal to the linear speed of the belt.) In this instance the peripheral speed of the fat center portion is greater than that of the reduced diameter end portions by the ratio of the diameters. For purposes of illustration it will be assumed that the belt and increased diameter portion move at the same speed. Accordingly, the end $L/2$ portions exert a drag effect on the belt which tend to swing the belt about them as a pivot. Since a stable condition has been assumed, these end dragging forces effectively cancel one another out and there are no imbalanced forces acting on the belt. The sum total of the co-acting forces between the belt and roller is indicated generally by the force vector 81 which in this instance is shown as acting at the center of the increased diameter portion in a direction perpendicular to the longitudinal axis of the roller.

In FIGURE 3 the forces acting on the belt in a decentered position are illustrated. When running centered the belt will take the position shown in solid and the resultant force vector 81 will act in a direction parallel to the longitudinal travel of the belt and perpendicular to the roller axis as in FIGURE 2. As the belt shifts to the right, the following force changes occur: The length of contact between the right edge of the belt as viewed in FIGURE 3 and the reduced diameter portion of the roller increases to a total of $L/2+x$, where $x$ is the increased length of contact. At the same time, the length of contact between the left edge of the belt and the reduced diameter portion of the roller will decrease to a value of $L/2-x$. The resultant increased drag at the right would pivot the belt about the roller if the roller was fixed and the belt free to move sideways. Since the belt travels a relatively confined path and the roller is freely suspended by chains 75 however, the roller pivots to the phantom line position and the resultant force vector 82 acts on the belt at an angle. The resulting force on the belt tends to shift it back to its original centered condition. As the belt moves to the left, the end portions in contact with the reduced portions of the roller will tend to equalize at $L/2$, and as the imbalanced effect decreases the roller will swing back to an equilibrium condition in which it is stabilized in a plane parallel to the plane of the return reach.

A variation of the invention is illustrated in FIGURES 4 and 5. In this instance the chain suspension assembly 75 of FIGURE 1 has been replaced by a lost motion linkage indicated generally at 83 and the fat center roller has been replaced by a double tapered roller 84. A sleeve assembly consisting of upper sleeve 85 and lower sleeve 86 is received on the internal telescoping member 55. Set screw 87 tightens sleeve 86 on 55, and a link member 88 welded to the base of sleeve 85 bears upon the upper surface of sleeve 86. Sleeve 85 and link 88 are free to swivel about telescoping member 55 as a pivot. A slot 89 in rotatable link 88 receives a vertical pivot pin 90 carried by shaft extension 91 of roller shaft 92. A small vertical guide roller 93 is journaled on shaft 94 which is anchored in extension 91. The ends of the roller are in effect relatively freely suspended and can move forward and backward in response to belt travel.

Roller 84 has a double taper. Starting at the extreme ends at a reduced diameter, the roller diameter increases to a maximum at the center. Belt 70 contacts the roller throughout the belt width, since the angle of taper is not greater than the flexibility of the belt. The belt does not completely span the roller for a purpose which will appear hereinafter. The guide rollers 92 are positioned with only a slight clearance between the edge of the roller. ½ to ⅝ of an inch clearance is ample.

The conveying reach of the belt is supported by a roller assembly including center roller 59 and wing rollers 60, 61, pivotally connected by links 62. In this instance, the rollers have been suspended directly from the strands by a flat link and hook assembly 95. A cradled assembly similar to that of FIGURE 1 could be utilized however.

In FIGURE 6 a double tapered return roller is illustrated. In this instance it has been formed from a pair of uniform diameter rollers, one of which is illustrated in FIGURE 7. The left half 96 has been formed by cutting a long triangular slot 97 in the uniform diameter roller of FIGURE 7 and the exposed edges seam welded at 98. The right half may be similarly formed and the two joined by butt welding their large ends as at 99. In this instance the mid-portion or midseam 99 is canted slightly with respect to the longitudinal axis of the roller, and the taper is not symmetrical about the longitudinal axis. This uneven surface is just as effective as a uniform taper, and in some cases more effective since it imparts a bumping or slapping effect to the belt which aids in swinging the link about the stand 55. If the roller is turned, a perfectly uniform taper can be obtained.

In FIGURE 8, a double tapered roller is suspended by a flexible chain, and in FIGURE 9, a fat center roller is suspended by the lost motion linkage of FIGURE 4. In both embodiments a roller having an increased mid-diameter is relatively freely suspended so the roller may accommodate itself to the operating conditions.

The use and operation of the invention is as follows:

In the preferred embodiment of FIGURE 1 the return roller 72 is relatively freely suspended at its ends by chains 75. In effect, the roller is suspended as a pendulum from, in this instance, flexible strands 50 and 51. It is swingable in a plane generally parallel to the plane of the belt and one end is free to move downstream in the direction of belt travel while the other moves upstream. Alternately, one end may remain relatively stationary while the other moves either upstream or downstream, or each end may move upstream or downstream simultaneously.

In the balanced or equilibrium running condition of FIGURE 2, belt 70 contacts the increased diameter portion of the roller along its entire length. In one embodiment, a ratio in diameters of the fat center portion to the side flanking portions of 1.1 to 1.0 was utilized with exceptionally good results. Only the edges contact the reduced diameter portion of the roller and free spaces 79, 80 are formed between these contact areas. The belt is positively driven and transmits rotative forces to the roller which is rotatably journaled on the shaft 73.

Although the exact theory underlying the invention has not been determined to a mathematical certainty, the following is thought to be a fairly accurate description of the underlying forces and physical relationships.

For purposes of illustration it may be assumed that the belt speed is equal to the peripheral speed of the fat center portion 78 of the roller. The peripheral speed of the roller at the outside contact areas will therefore be less than the speed of the belt by approximately the ratio of the diameters of the roller at the respective points. As a result, the outside contact areas each exert a drag effect upon the belt since skidding of sliding friction rather than rolling friction is present at these points. When the belt runs centered, the drag effect of the outside contact areas will cancel one another and the resultant training effect on the belt is represented by force vector 81 which in this instance lies in the direction of belt travel. (Actually the peripheral speed of the fat center may be slightly less than the speed of the belt so that sliding friction is also present here.)

In FIGURE 3, the normal running condition of FIGURE 2 is illustrated in solid lines and a condition of unbalance in dotted lines. In this figure of the belt has shifted to the right due to shifting of a flexible strand supporting stand or other cause. As the belt moves to the right, the left area of contact between belt and roller will decrease to $L/2-x$, where $x$ represents the decrease in contact. The noncontact areas 79 and 80 may be assumed to remain substantially constant due to the inherent stiffness of the belt. At the same time the right area of contact between belt and roller will increase by $x$, to $L/2+x$. Since the amount of sliding friction, or drag, is proportional to the contact between the belt and roller, the right edge of the roller will shift forward in the direction of belt travel due to the difference in drag as represented by the length of the force vector arrows 82L and 82R. The resultant force 82 acting on the belt will be skewed slightly to the left of the direction of belt travel thereby tending to move the belt back to a centered position. As the belt moves to the left, the freely suspended ends of the roller will swing back to the solid line position.

The same basic principles underlie the operation of FIGURE 4 embodiment. That is, the elongated connectors enable the return roller to stabilize in a plane generally parallel to the plane of the return reach of the belt. In this instance, the suspending chains have been replaced by a lost motion linkage which still maintains the rollers in a relatively freely suspended condition. Thus in FIGURE 5, roller 84 will occupy the solid line position when the belt moves in the direction of the solid arrow and the dotted line position when the direction of belt travel is reversed.

The forces tending to cause reversal of links 88 are substantially similar to those described in connection with the embodiment of FIGURE 1. As the belt passes over the roller, it may be assumed that the peripheral speed of the roller at its mid-portion, which in this instance is the center of the roller, and its greatest diameter, is substantially equal to the speed of the belt. The roller speed with respect to the belt decreases proportionately to the distance from the center of the roller (assuming a uniformly tapered roller). If the roller is not uniformly tapered, which is considered to be within the scope of the invention, roller speed with respect to belt speed will be proportional to the diameter of the roller at the point of contact as compared to the diameter at the center. In any case, the amount of drag on the belt increases towards the edges of the belt.

Only the normal operating condition of the belt has been shown. If for example the belt becomes detrained to the right the contact between the belt and roller to the right of center will increase and the contact to the left of center will correspondingly decrease. The roller half in greater contact with the belt will become canted in the direction of belt travel. Since the ends of the rollers are relatively free to move due to lost motion linkage 83, the resultant training effect will tend to urge the belt to a centered position. Vertical rollers 93 prevent excessive belt displacement if the automatic compensating effect does not immediately center the belt.

In this embodiment particularly, the roller must be enough longer than the belt is wide so the belt may hunt from side to side, thus generating a differential drag. Accordingly, in FIGURES 4 and 5, roller 84 is shown extending beyond the belt on each side to allow some hunting room.

One advantage of the embodiment of FIGURE 1 over FIGURE 4 is that the cylindrical sleeve 78 need not have as large a diameter as the center portion of tapered roller 84 to get the same training effect.

In FIGURES 6 and 7 one method of fabricating a double tapered roller is illustrated. Two uniform diameter rollers 96 are slotted as at 97, the slot edges welded together and the butt edges similarly welded. This usually results in an unsymmetrically shaped roller as illustrated by the variance of the longitudinal axis of each half from the longitudinal axis of a uniform diameter roller. These unsymmetrical double tapered rollers have been found to work as well as the uniformly tapered roller. The actual choice may depend upon external considerations such as cost of fabrication.

In FIGURE 8, a variation of the invention has been shown in which the chain suspension feature of FIGURE 1 has been combined with the double tapered roller feature of FIGURE 4. The principle of operation is the same so long as the ends of the roller assembly are maintained a substantially fixed distance apart and swingable movement of the roller is provided. In FIGURE 9, the lost motion linkage suspension has been illustrated in connection with the fat center roller, and the principle of operation is substantially the same.

Various modifications will be apparent to those skilled in the art. For example the sleeves which form the fat center portions of the rollers in FIGURE 1 can be replaced by a spring or rubber sleeve having a regularly grooved surface. This reduces the contact area between the belt and roller and cuts center drag to a minimum, thereby saving power.

The foregoing description is illustrative only and not definitive. Accordingly the invention should not be limited except by the scope of the following appended claims.

I claim:

1. An automatic belt training return roller assembly for the intermediate portion of the return reach of a flexible belt conveyor of the type in which the return reach of a flexible conveyor belt is supported by a plurality of return rollers, said return roller assembly being automatically operable, in response to passage thereover of a return reach of a flexible conveyor belt in a detrained condition, to exert a retraining effect on the belt irrespective of the direction of belt travel, said return roller assembly including, in combination, a cylindrical return roller of a length substantially greater than the width of the flexible belt with which it is to be used, said return roller having an expanded diameter mid-portion substantially shorter than the width of the conveyor belt with which it is to be used to thereby enable the flexible belt to contact roller portions of different diameter, elongated connectors for suspending the return roller, by its end portions, from elevated support locations, each elongated connector being effectively secured, at its lower end portion, to an end portion of the return roller, and being adapted for securement, at its upper end portion, to an elevated support location, the elongated connectors being secured to the end portions of the return roller so as to enable the return roller to swing forward and backward, irrespective of the direction of belt travel, simultaneously or alternately in response to the passage of the return reach thereover in a detrained condition, the elongated connectors being generally vertically oriented in a plane transverse to the normal, in train direction of movement of the return reach.

2. The return roller assembly of claim 1 further characterized in that the mid-portion of the return roller has a substantially constant diameter.

3. The return roller assembly of claim 2 further characterized in that the length of the expanded diameter mid-portion is on the order of about one-third the width of the return reach of the belt with which it is to be used.

4. The return roller assembly of claim 3 further characterized in that the ratio of the diameters of the mid-portion to the flanking portions of the return roller is substantially 1.1 to 1.0.

5. The return roller assembly of claim 1 further characterized in that the elongated connectors are lengths of chain.

6. In combination in a flexible belt conveyor, a pair of rope sideframes, means for supporting the rope sideframes in generally parallel relationship to one another, a plurality of troughing idler assemblies carried by the rope sideframes, an endless, orbitally movable flexible conveyor belt having a conveying reach and a return reach, the conveying reach being supported by the troughing idler assemblies, the return reach being supported by a plurality of return roller assemblies, a pair of end pulleys, one for each end of the orbitally movable belt, the endless belt being wrapped around the pulleys, at least one of said return roller assemblies being automatically operable in response to passage thereover of the return reach of the flexible conveyor belt in a detrained condition to exert a retraining effect on the belt irrespective of the direction of belt travel, said return roller assembly including in combination, a cylindrical return roller of a length substantially greater than the width of the return reach of the flexible belt with which it is to be used, said return roller having an expanded diameter mid-portion, the length of the expanded diameter mid-portion being substantially shorter than the width of the conveyor belt with which it is to be used to thereby enable the flexible belt to contact different diameter portions of the roller, elongated connectors for suspending the return roller, by its end portions, from elevated support locations, each elongated connector being secured, at its lower end portion, to an end portion of the return roller, and being adapted for securement, at its upper end portion, to an elevated support location, the elongated connectors being so secured to the end portions of the return roller as to enable the return roller to swing forward and backward, irrespective of the direction of belt travel, simultaneously or alternately in response to the passage of the return reach thereover in a detrained condition, the elongated connectors being generally vertically oriented in a plane transverse to the normal, in train direction of movement of the return reach.

7. The return roller assembly of claim 1 further characterized in that the return roller tapers in both directions outwardly from the expanded diameter mid-portion.

8. The return roller assembly of claim 7 further characterized in that the tapered portions of the return roller meet in a common plane.

9. The return roller assembly of claim 7 further characterized in that the return roller tapers non-uniformly.

10. An automatic belt training return roller assembly for the intermediate portion of the return reach of a flexible belt conveyor of the type in which the return reach of a flexible conveyor belt is supported by a plurality of return rollers, said return roller assembly being automatically operable, in response to passage thereover of a return reach of a flexible conveyor belt in a detrained condition, to exert a retraining effect on the belt irrespective of the direction of belt travel, said return roller assembly including, in combination, a cylindrical return roller of a length substantially greater than the width of the flexible belt with which it is to be used, said return roller having an expanded diameter mid-portion substantially shorter than the width of the conveyor belt with which it is to be used to thereby enable the flexible belt to contact roller portions of different diameter, elongated connectors for suspending the return roller, by its end portions, from support locations, each elongated connector having one end portion secured to an end portion of the return roller, and its other end portion swingably secured to a support location, the elongated connectors being secured to the end portions of the return roller so as to enable the return roller to swing forward and backward, irrespective of the direction of belt travel, simultaneously or alternately in response to the passage of the return reach thereover in a detrained condition, the elongated connectors being generally swingable in a plane which enables the return roller to stabilize in a plane parallel to the plane of the return reach.

References Cited in the file of this patent

UNITED STATES PATENTS

| 752,202 | Chritton | Feb. 16, 1904 |
|---|---|---|
| 1,879,232 | Henry | Sept. 27, 1932 |
| 2,241,219 | Plausics | May 6, 1941 |
| 2,451,394 | Klein | Oct. 12, 1948 |
| 2,577,926 | Stiles | Dec. 11, 1951 |
| 2,797,089 | Lorig | June 25, 1957 |
| 2,815,851 | Yoshimura | Dec. 10, 1957 |
| 2,847,114 | Orr | Aug. 12, 1958 |
| 2,904,166 | Stinson | Sept. 15, 1959 |
| 2,925,168 | Lorig | Feb. 16, 1960 |

FOREIGN PATENTS

| 738,598 | Germany | Sept. 3, 1943 |